(12) United States Patent
Das et al.

(10) Patent No.: US 11,462,096 B1
(45) Date of Patent: Oct. 4, 2022

(54) HIGH CAPABILITY SWITCH MOVEMENT FOR AUTOMOTIVE MODEMS

(71) Applicant: QUALCOMM Incorporated, San Diego, CA (US)

(72) Inventors: Soumya Das, San Diego, CA (US); Harshan Venkatasalam, Madurai (IN); Gunbir Singh, Hyderabad (IN); Vamsi Krishna Potti, Hyderabad (IN); Abhinav Mishra, Hyderabad (IN); Ahmed Sabeeh Quadri, Panvel (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/243,427

(22) Filed: Apr. 28, 2021

(51) Int. Cl.
*G08B 25/01* (2006.01)
*G07C 5/00* (2006.01)
*H04W 4/40* (2018.01)
*G08G 1/00* (2006.01)
*H04W 4/90* (2018.01)

(52) U.S. Cl.
CPC .......... *G08B 25/016* (2013.01); *G07C 5/008* (2013.01); *G08G 1/205* (2013.01); *H04W 4/40* (2018.02); *H04W 4/90* (2018.02)

(58) Field of Classification Search
CPC ........ G08B 25/016; H04W 4/90; H04W 4/40; G07C 5/008; G08G 1/205
See application file for complete search history.

(56) References Cited

U.S. PATENT DOCUMENTS

| | | | |
|---|---|---|---|
| 10,637,142 B1* | 4/2020 | Tran | H01Q 1/44 |
| 2018/0330611 A1* | 11/2018 | Jiang | H04W 56/0035 |
| 2020/0364953 A1* | 11/2020 | Simoudis | G07C 5/085 |
| 2020/0383157 A1* | 12/2020 | Lee | H04L 41/12 |

FOREIGN PATENT DOCUMENTS

| | | |
|---|---|---|
| EP | 2947856 B1 | 11/2018 |
| JP | 2019191855 A | 10/2019 |
| NO | 2016208914 A1 | 12/2016 |

OTHER PUBLICATIONS

International Search Report and Written Opinion—PCT/US2022/070775—ISA/EPO—dated May 20, 2022.

* cited by examiner

*Primary Examiner* — Hoi C Lau
(74) *Attorney, Agent, or Firm* — Thien T. Nguyen

(57) ABSTRACT

In an aspect, a method includes determining, by a processor of a vehicle, that an original equipment manufacturer (OEM) subscription of the vehicle is set to a low capability subscription. The method includes determining, by the processor, that the low capability subscription is unable to access a network at a current location of the vehicle based on the low capability subscription. The method also includes determining, by the processor and based on sensor data received from one or more sensors of the vehicle, a probability of an accident occurring to the vehicle. The method further includes determining, by the processor, that the probability satisfies a threshold. The method includes switching, by the processor, the OEM subscription from the low capability subscription to a high capability subscription.

30 Claims, 8 Drawing Sheets

HIGH CAPABILITY SWITCH MOVEMENT FOR AUTOMOTIVE MODEMS

BACKGROUND OF THE DISCLOSURE

1. Field of the Disclosure

Aspects of this disclosure relate generally to wireless communications, and more specifically to an emergency call (eCall) using an original equipment manufacturer (OEM) subscription.

2. Description of the Related Art

An emergency call (eCall) is an emergency call that a vehicle automatically places to bring rapid assistance after the vehicle detects that an accident occurred. eCall is currently mandated for vehicles in the European Union and may be adopted by other regions/countries. With eCall, after the vehicle's sensors detect that the vehicle has crashed, the vehicle automatically initiates a call to Public Safety Answering Point (P SAP) which then dispatches emergency assistance to the location of the vehicle.

Vehicles may include a Dual Sim Dual Active (DSDA) modem with support for two Subscriber Identity Module (SIM) cards. The two SIM cards may enable the vehicle to access (1) a high capability subscription and (2) a low capability subscription that has less capabilities (e.g., access to fewer types of networks) than the high capability subscription. Each vehicle has an Original Equipment Manufacturer (OEM) subscription that is used by the vehicle to place the eCall. A manufacturer of a vehicle can set the OEM subscription to be associated with either the high capability subscription or the low capability subscription. If (1) the manufacturer sets the OEM subscription to be associated with the low capability subscription and (2) the vehicle has an accident in a location where the types of networks accessible to the low capability subscription are unavailable, then the vehicle may be unable to quickly place the eCall. For example, after the accident occurs, the OEM subscription (associated with the low capability subscription) scans for types of networks that the low capability subscription can access. After the scan fails to identify a usable network, the vehicle may take corrective action in an attempt to place the eCall. The time taken to (i) scan for networks that the low capability subscription can access, (ii) determine that such networks are unavailable, and (iii) take corrective action can take up to a minute or more, wasting precious time after an accident has occurred.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In a first aspect, a method includes determining, by a processor of a vehicle, that an original equipment manufacturer (OEM) subscription of the vehicle is set to a low capability subscription. The method includes determining, by the processor, that the low capability subscription is unable to access a network at a current location of the vehicle based on the low capability subscription. The method also includes determining, by the processor and based on sensor data received from one or more sensors of the vehicle, a probability of an accident occurring to the vehicle. The method further includes determining, by the processor, that the probability satisfies a threshold. The method includes switching, by the processor, the OEM subscription from the low capability subscription to a high capability subscription.

In a second aspect, a vehicle includes: one or more sensors, a memory, a transceiver, and a processor that is communicatively coupled to the memory and the transceiver. The processor is configured to determine that an original equipment manufacturer (OEM) subscription of the vehicle is set to a low capability subscription. The processor is configured to determine that the low capability subscription is unable to access a network at a current location of the vehicle based on the low capability subscription. The processor is configured to determine, based on sensor data received from the one or more sensors, a probability of an accident occurring to the vehicle. The processor is configured to determine that the probability satisfies a threshold and switch the OEM subscription from the low capability subscription to a high capability subscription.

In a third aspect, a non-transitory computer-readable storage medium is configured to store instructions executable by one or more processors to: determine that an original equipment manufacturer (OEM) subscription of a vehicle is set to a low capability subscription, determine that the low capability subscription is unable to access a network at a current location of the vehicle based on the low capability subscription, determine, based on sensor data received from one or more sensors, a probability of an accident occurring to the vehicle, determine that the probability satisfies a threshold, and switch the OEM subscription from the low capability subscription to a high capability subscription.

In a fourth aspect, an apparatus includes: means for determining that an original equipment manufacturer (OEM) subscription of a vehicle is set to a low capability subscription, means for determining that the low capability subscription is unable to access a network at a current location of the vehicle based on the low capability subscription, means for determining, based on sensor data received from one or more sensors, a probability of an accident occurring to the vehicle, means for determining that the probability satisfies a threshold, and means for changing the OEM subscription from the low capability subscription to a high capability subscription.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof. A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
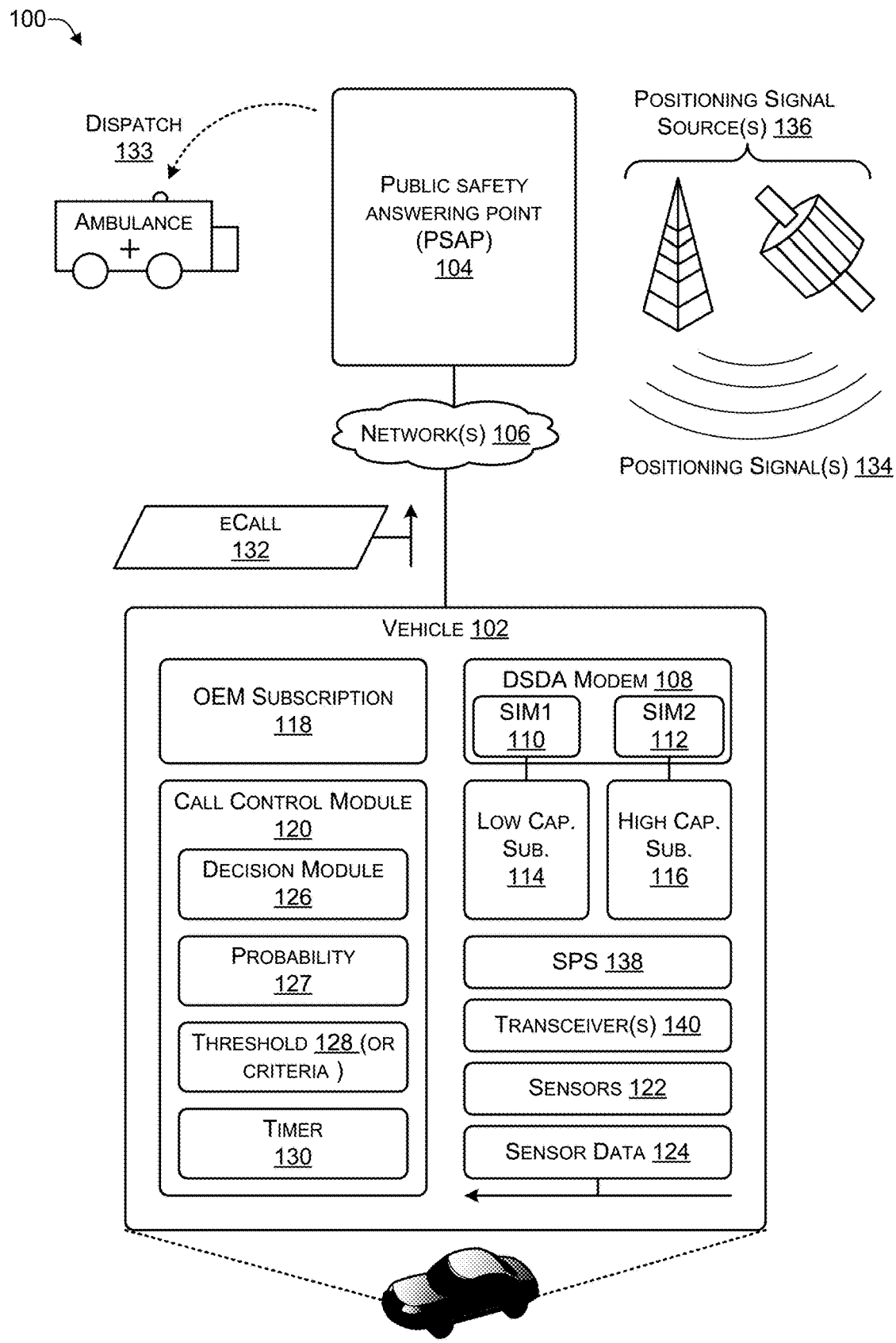
FIG. 1 illustrates an example of a system to automatically switch an Original Equipment Manufacturer (OEM) subscription prior to placing an emergency call (eCall), according to various aspects of the disclosure.

Disclosed are systems and techniques for reducing the time to place an emergency call (eCall) after a vehicle is in an accident. When a vehicle is moving, a call control module (sometimes referred to as an access point because the call control module enables the vehicle to access one or more networks) of the vehicle determines whether the Original Equipment Manufacturer (OEM) subscription is set to the low capability subscription. If the OEM subscription is set to the low capability subscription, then the call control module determines coverage (e.g., which networks are currently available for access) associated with the OEM subscription. If the OEM subscription is set to the low capability subscription and the networks that the low capability subscription is capable of accessing are unavailable at a current location of the vehicle, then the call control module may use current sensor data to determine a probability that the vehicle will be involved in an accident. For example, the call control module may take into account a speed of the vehicle, a posted speed limit of the road on which the vehicle is currently traveling, a proximity of the vehicle to other vehicles (e.g., is the vehicle located in light traffic or heavy traffic), weather conditions (e.g., rain, sleet, snow, fog, or the like), whether the vehicle is on a relatively straight road or on a relatively curvy road (e.g., with multiple curves), how many accidents have historically occurred on the road on which the vehicle is currently traveling, and other factors when determining the probability that the vehicle will be involved in an accident. In some cases, a weighted average of various factors may be used. In other cases, a machine learning algorithm that has been trained based at least in part on accident data may be used to predict the probability that the vehicle will be involved in an accident. If the probability that the vehicle will be involved in an accident satisfies a particular threshold, then the call control module automatically switches the OEM subscription to the high capability subscription, e.g., before an accident occurs. The call control module automatically switches the OEM subscription to the high capability subscription because, in the current location of the vehicle, the low capability subscription does not have access to any networks to place an eCall. If the vehicle is involved in an accident, the vehicle is capable of immediately placing the eCall using the OEM subscription that is currently switched to the high capability subscription. Thus, an advantage provided by the systems and techniques disclosed herein is that the OEM subscription is already associated with the high capability subscription when the accident occurs, thereby enabling the vehicle to immediately place the eCall. In this way, the delay (e.g., at least one minute) caused by the call control module scanning for an available network, when the OEM subscription is associated with the low capability subscription, is avoided.

After the probability of an accident falls below a particular threshold, the call control module switches the OEM subscription back to the low capability subscription, if the OEM subscription was originally associated with the low capability subscription. To prevent the call control module from switching the OEM subscription back and forth from the high capability subscription to the low capability subscription, a timer (e.g., a hysteresis timer) is used after switching the OEM subscription to the high capability subscription. For example, a road that is relatively curvy may have portions that are relatively straight. Without the timer, the call control module may switch the OEM subscription to the high capability subscription on the relatively curvy portions and switch to the OEM subscription to the low capability subscription on the relatively straight portions. To avoid the call control module frequently switching the OEM subscription back and forth between the low capability subscription and high capability subscription, the timer may keep the OEM subscription associated with the high capability subscription during the times that the vehicle is traveling on the relatively straight portions. As another example, when inclement weather conditions temporarily abate, the timer may keep the OEM subscription associated with the high capability subscription during the temporary abatement.

Thus, by anticipating (e.g., predicting) when a vehicle is likely to be involved in an accident when (1) the OEM subscription is associated with the low capability subscription and (2) networks are unavailable using the low capability subscription (e.g., at a current location of the vehicle), the vehicle can switch the OEM subscription to the high capability subscription. By doing so, if the vehicle is involved in an accident, the vehicle is able to quickly (e.g., without the delay caused by scanning for and not finding an available network) place an eCall to a PSAP. In this way, emergency vehicles can be quickly dispatched to aid a potentially injured vehicle occupants to reduce the impact of injuries caused by the accident.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "example" and/or "exemplary" are used herein to mean "serving as an example, instance, or illustration." Any aspect described herein as "example" and/or "exemplary" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send radio frequency (RF) signals to a base station is called an uplink (UL) channel (e.g., a reverse traffic channel, a reverse control channel, an access channel, etc.). A communication link through which the base station can send RF signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal," a "positioning signal," a "radio wave," a "waveform," or the like, or simply a "signal" where it is clear from the context that the term "signal" refers to a wireless signal or an RF signal.

A vehicle determines that an original equipment manufacturer (OEM) subscription is set to a low capability subscription. When the vehicle determines that the types of networks that the low capability subscription can access are unavailable at a current location of the vehicle, the vehicle performs an analysis of sensor data from multiple sensors to determine a probability that an accident will occur. For example, the analysis may include determining whether a speed of the vehicle exceeds a posted speed limit and whether the vehicle is travelling through inclement weather (e.g., rain, sleet, snow, or fog). If the probability satisfies a threshold, then the vehicle automatically switches the OEM subscription to a high capability subscription that can access at least one type of network that the low capability subscription cannot access. When an accident occurs, the high capability subscription enables the vehicle to automatically place an emergency call (eCall).

As a first example, a method may include: determining that an original equipment manufacturer (OEM) subscription of a vehicle is set to a low capability subscription, determining that the low capability subscription is unable to access a network at a current location of the vehicle, determining, based on sensor data received from one or more sensors of the vehicle, a probability of an accident occurring to the vehicle, determining that the probability satisfies a threshold, and switching the OEM subscription from the low capability subscription to a high capability subscription. The high capability subscription may be capable of accessing at least one type of network that the low capability subscription cannot access. The method may include determining that the accident has occurred to the vehicle and initiating an emergency call (eCall) to a Public Safety Answering Point (PSAP). Determining the probability of the accident occurring to the vehicle may include receiving the sensor data from the one or more sensors and using a machine learning algorithm (e.g., support vector machine or the like) to determine, based on the sensor data, the probability of the accident occurring to the vehicle. The method may include setting a timer, determining, based on second sensor data received from the one or more sensors of the vehicle, a second probability, determining, that the second probability fails to satisfy the threshold, and after determining that the timer has expired, switching the OEM subscription from the high capability subscription to the low capability subscription. The method may include determining, based on the sensor data received from the one or more sensors of the vehicle, the probability that the accident will occur to the vehicle comprises at least one of: (1) determining that a vehicle speed exceeds a posted limit of a roadway on which the vehicle is travelling, (2) determining that the vehicle is travelling in inclement weather comprising at least one of rain, sleet, snow, or fog, (3) determining that at least one of gyroscope data or accelerometer data indicates aggressive driving, or (4) determining that cellular vehicle-to-everything (C-V2X) data indicates a relatively high traffic density (e.g., more than a threshold number of cars T, where T>0) in close proximity to the vehicle. The method may include determining an estimated time of arrival at a destination programmed into a navigation system of the vehicle and setting a timer based in part on a difference between the estimated time of arrival and a current time. The method may include determining a destination programmed into a navigation system of the vehicle, determining a length of time that inclement weather is predicted to be encountered enroute to the destination, and setting a timer based at least in part on the length of time. The method may include determining a destination programmed into a navigation system of the vehicle, determining an estimated amount of time to be spent navigating one or more curves enroute to the destination, and setting a timer based at least in part on the estimated amount of time.

As a second example, a vehicle may include one or more sensors, one or more processors, and one or more non-transitory computer-readable storage media to store instructions executable by the one or more processors to perform various operations. For example, the operations may include determining that an original equipment manufacturer (OEM) subscription of the vehicle is set to a low capability subscription, determining that, at a current location of the vehicle, the low capability subscription is unable to access a network, determining, based on sensor data received from the one or more sensors, a probability of an accident occurring to the vehicle, determining that the probability satisfies a threshold, and switching the OEM subscription from the low capability subscription to a high capability subscription. The operations may include determining that the accident has occurred to the vehicle and initiating an emergency call (eCall) to a Public Safety Answering Point (PSAP). Determining, based on the sensor data received from the one or more sensors of the vehicle, the probability of the accident occurring to the vehicle may include receiving the sensor data from the one or more sensors and using a machine learning algorithm to determine, based on the sensor data, the probability of the accident occurring to the vehicle. The operations may include setting a timer, determining, based on second sensor data received from the one or more sensors of the vehicle, a second probability, determining, that the second probability fails to satisfy the threshold, and after determining that the timer has expired, switching the OEM subscription from the high capability subscription to the low capability subscription. The high capability subscription is capable of accessing at least one type of network that the low capability subscription cannot access. Determining, based on the sensor data received from the one or more sensors of the vehicle, the probability that the accident will occur to the vehicle comprises at least one of: (1) determining that a vehicle speed exceeds a posted limit of a roadway on which the vehicle is travelling, (2) determining that the vehicle is travelling in inclement weather comprising at least one of rain, sleet, snow, or fog, (3) determining that at least one of gyroscope data or accelerometer data indicates aggressive driving, or (4) determining that cellular vehicle-to-everything (C-V2X) data indicates a relatively high traffic density around the vehicle. The operations may include determining an estimated time of arrival at a destination programmed into a navigation system of the vehicle and setting a timer based in part on a difference between the estimated time of arrival and a current time. The operations may include determining a destination programmed into a navigation system of the vehicle, determining a length of time that inclement weather is predicted to be encountered enroute to the destination, and setting a timer based at least in part on the length of time. The operations may include determining a destination programmed into a navigation system of the vehicle, determining an estimated amount of time to be spent navigating one or more curves enroute to the destination, and setting a timer based at least in part on the estimated amount of time.

As a third example, one or more non-transitory computer-readable storage media may store instructions executable by one or more processors to perform various operations. For example, the operations may include determining that an original equipment manufacturer (OEM) subscription of a vehicle is set to a low capability subscription, determining that, at a current location of the vehicle, the low capability subscription is unable to access a network, determining, based on sensor data received from one or more sensors, a probability of an accident occurring to the vehicle, determining that the probability satisfies a threshold, and switching the OEM subscription from the low capability subscription to a high capability subscription. The high capability subscription is capable of accessing at least one type of network that the low capability subscription cannot access. The operations may include determining that the accident has occurred to the vehicle and initiating an emergency call (eCall) to a Public Safety Answering Point (PSAP). Determining, based on the sensor data received from the one or more sensors of the vehicle, the probability of the accident occurring to the vehicle may include receiving the sensor data from the one or more sensors, and using a machine learning algorithm to determine, based on the sensor data, the probability of the accident occurring to the vehicle. The operations may include setting a timer, determining, based on second sensor data received from the one or more sensors of the vehicle, a second probability, determining, that the second probability fails to satisfy the threshold, and after determining that the timer has expired, switching the OEM subscription from the high capability subscription to the low capability subscription. Determining, based on the sensor data received from the one or more sensors of the vehicle, the probability that the accident will occur to the vehicle comprises at least one of: (1) determining that a vehicle speed exceeds a posted limit of a roadway on which the vehicle is travelling, (2) determining that the vehicle is travelling in inclement weather comprising at least one of rain, sleet, snow, or fog, (3) determining that at least one of gyroscope data or accelerometer data indicates aggressive driving, or (4) determining that cellular vehicle-to-everything (C-V2X) data indicates a relatively high traffic density around the vehicle. The operations may include determining an estimated time of arrival at a destination programmed into a navigation system of the vehicle and setting a timer based in part on a difference between the estimated time of arrival and a current time. The operations may include determining a destination programmed into a navigation system of the vehicle, determining a length of time that inclement weather is predicted to be encountered enroute to the destination, and setting a timer based at least in part on the length of time. The operations may include determining a destination programmed into a navigation system of the vehicle, determining an estimated amount of time to be spent navigating one or more curves enroute to the destination, and setting a timer based at least in part on the estimated amount of time.

FIG. 1 illustrates an example of a system 100 to automatically switch an OEM subscription prior to placing an eCall, according to various aspects of the disclosure. In the system 100, a vehicle 102 is connected to a public safety answering point (PSAP) 104 via one or more networks 106. For example, the one or more networks 106 may include Long Term Evolution (LTE), Global System for Mobile (GSM), Code Division Multiple Access (CDMA), Wideband CDMA (WCDMA), 5G New Radio (NR) Radio Access Technology (RAT), another type of wireless technology, or any combination thereof.

The vehicle 102 includes a Dual Sim Dual Active (DSDA) modem 108 with two subscriber identification module (SIM) cards, SIM1 110 and SIM2 112. The SIM1 110 is associated with a low capability subscription 114 and the SIM2 112 is associated with a high capability subscription 116. The high capability subscription 116 is capable of communicating with multiple networks, such as, for example, LTE, GSM, CDMA, WCDMA, NR RAT, and the like. In contrast, the low capability subscription 114 is capable of communicating with a smaller number of networks, such as, for example, LTE and GSM. A manufacturer of the vehicle 102 may set an original equipment manufacturer (OEM) subscription 118 to be associated with either the low capability subscription 114 or the high capability subscription 116. The vehicle 102 includes transceivers 140 to transmit and receive signals from various sources (e.g., positioning signals 134 from positioning signal sources 136). The transceivers 140 may include one or more transceivers to transmit and receive cellular-based or WWAN signals such as, for example, LTE, GSM, CDMA, WCDMA, 5G, and the like. The transceivers 140 may also include one or more transceivers for short-range communications including WLAN, Bluetooth, UWB, etc.

The vehicle 102 includes a call control module 120 and sensors 122 to provide sensor data 124. The call control module 120 includes a decision module 126 to analyze the sensor data 124 to determine a probability 127. The decision module 126 determines that the vehicle 102 will be involved in accident when the probability 127 satisfies a threshold 128 (e.g., probability >=75%, 80%, 90%, 95%, or the like). In some cases, the decision module 126 may determine whether the sensor data 124 satisfy one or more criteria. The call control module 120 may include a timer 130 (e.g., a timer).

The vehicle 102 may include one or more positioning components, such as satellite positioning system (SPS) 138, to receive positioning signals 134 from one or more positioning signal sources 136. For example, the positioning signals 134 may include Satellite Positioning System (SPS) signals, Global Navigation Satellite System (GNSS) signals, and the like. The transceivers 140 may be used to transmit and receive cellular signals, including positioning signals, such as code division multiple access (CDMA), global system for mobile (GSM), long term evolution (LTE), 5G, and the like. The sensor data 124 may include various types of sensor data generated from sensors 122. For example, sensor data 124 may include data captured by cameras 204, detailed map data, acceleration data, gyro data, weather data, vehicle sensor data (e.g., speed, tire pressure, etc.), radio detection and ranging (RADAR) and light detection and ranging (LIDAR), and the like data received from sensors. In some aspects, the vehicle 102 may combine the positioning signal sources 136 (e.g., including satellite signals, cellular signals, and short-range signals such as WLAN, etc.) and the sensor data 124 to perform hybrid positioning to determine a location of the vehicle 102. For example, the hybrid positioning may use satellite signals, cellular signals, Wi-Fi signals, other types of positioning signals, sensor data, or any combination thereof.

When the vehicle 102 is in motion, the call control module 120 may determine whether the OEM subscription 118 is set to the low capability subscription 114 or the high capability subscription 116. If the call control module 120 determines that the OEM subscription 118 is set to the high capability subscription 116, then no further action is taken as the high capability subscription 116 provides access to the largest number of available networks. If the call control module 120 determines that the OEM subscription 118 is set to the low capability subscription 114, then the call control module 120 periodically (e.g., every M Milliseconds, M>0) determines whether the low capability subscription 114 has access to at least one network (e.g., of the limited number of networks that the low capability subscription 114 is capable of accessing) at a current location of the vehicle 102.

If the call control module 120 determines that the OEM subscription 118 is unable to access any network (e.g., of the limited number of network types that the low capability subscription 114 is capable of accessing) at a current location of the vehicle 102, then the call control module 120 monitors the sensor data 124 using the decision module 126 and predicts a probability 127 that the vehicle 102 will be in an accident. In some cases, the decision module 126 may use a formula, such as a weighted sum of one or more of the sensor data 124, to predict the probability 127 associated with the vehicle 102 being involved in an accident. In other cases, the decision module 126 may determine whether the sensor data 124 satisfies one or more criteria (e.g., one or more of the thresholds 128) to predict whether the vehicle 102 will be involved in an accident. For example, the decision module 126 may predict that the vehicle 102 is likely to be involved in an accident if a speed of the vehicle 102 exceeds a first of the thresholds 128, a type of weather being experienced satisfies a second of the thresholds 128, an amount of traffic surrounding the vehicle 102 satisfies a third of the thresholds 128, and so on. In still other cases, the decision module 126 may use machine learning to predict whether the vehicle 102 will be involved in an accident. For example, the machine learning may use supervised learning (e.g., active learning, classification, or regression) to predict the probability 127 that the vehicle 102 will be involved in an accident. If the probability 127 satisfies the threshold 128, then the call control module 120 automatically switches the OEM subscription 118 from the low capability subscription 114 to the high capability subscription 116, thereby making more networks available to the vehicle 102 (e.g., as compared to the low capability subscription 114). If the vehicle 102 is involved in an accident, then the call control module 120 initiates the eCall 132 to the PSAP 104. In response, the PSAP 104 issues a dispatch 133 to one or more emergency personnel, such as an emergency medical technician, to provide medical aid to occupants of the vehicle 102.

To reduce the possibility of the call control module 120 frequently switching the OEM subscription 118 from the low capability subscription 114 to the high capability subscription 116 and back, after switching the OEM subscription 118 to the high capability subscription 116, the call control module 120 sets the timer 130 a timer (e.g., a hysteresis timer) to a particular time (e.g., between about 5 minutes to about 30 minutes). The call control module 120 may wait until the timer 130 has expired before switching the OEM subscription 118 back to the low capability subscription 114. The call control module 120 may take into consideration a length of a journey programmed into a satellite navigation system of the vehicle 102 when setting the timer 130. For example, suppose that a satellite navigation system of the vehicle 102 is programmed for a journey estimated to take X (e.g., 30) minutes and Y (e.g., 10) minutes into the journey, the decision module 126 determines that the probability 127 of an accident satisfies the threshold 128. In this example, the call control module 120 may set the timer 130 to X−Y (=20) minutes, e.g., a remainder of the journey. The call control module 120 may take into consideration a remaining length of a curvy portion of a road on which the vehicle 102 is travelling. For example, assume the vehicle 102 is travelling on a road that was straight but now has multiple curves. The decision module 126 determines that the probability 127 of an accident satisfies the threshold 128 when a first curve is encountered, determines that the remaining curves will take about Z minutes to traverse, and set the timer 130 to Z minutes. The call control module 120 may take into account weather conditions when setting the timer 130. For example, suppose that, because of inclement weather (e.g., rain), the decision module 126 determines that the probability 127 of an accident satisfies the threshold 128. In this example, the call control module 120 may determine that inclement weather is expected to continue for W minutes and set the timer 130 to W minutes, e.g., when the weather is estimated to clear up. Thus, the timer 130 may be set based on a time of the journey, road conditions, weather conditions, traffic density, other sensor data, or any combination thereof. For example, assume the low capability subscription 114 is associated with two types of networks (e.g., LTE and GSM) while the high capability subscription 116 is associated with four types of networks (e.g., LTE, GSM, CDMA, WCDMA, and 5G). Thus, in this example, the high capability subscription 116 can access four types of networks while the low capability subscription can only access half as many, e.g., two types of networks. When the call control module 120 determines that no LTE or GSM networks are available at a current location of the vehicle 102 and the probability 127 of an accident satisfies the threshold 128, then the call control module 120 automatically switches the OEM subscription 118 from the low capability subscription 114 to the high capability subscription 116 to enable the OEM subscription 118 to access two additional types of networks (e.g., WCDMA and NR RAT), making it more likely that the eCall 132 can be placed when the vehicle 102 is in an accident.

Thus, when (1) the OEM subscription 118 is set at the factory to the low capability subscription 114, (2) the call control module 120 determines that in the current location of the vehicle 102, the OEM subscription 118 is unable to access any of the networks associated with the low capability subscription 114, and (3) the call control module 120 predicts, based on the sensor data 124, that the probability 127 of an accident occurring to the vehicle 102 satisfies the threshold 128, indicating that there is a high (e.g., 80%, 90%, 95% or higher) probability 127 that the vehicle 102 will be involved in an accident, then the call control module 120 automatically (e.g., without human interaction) switches the OEM subscription 118 from the low capability subscription 114 to the high capability subscription 116. In this way, the maximum number of the networks 106 are available to the OEM subscription 118 to make the eCall 132 when the vehicle 102 is involved in an accident.

There are several advantages to automatically and proactively switching the OEM subscription 118 from the low capability subscription 114 to the high capability subscription 116. First, by switching the OEM subscription 118 to the high capability subscription 116 before the vehicle 102 is involved in an accident, the maximum number of the networks 106 are made available to initiate the eCall 132 after the vehicle 102 is in an accident. Second, the call control module 120 does not spend time (e.g., up to a minute or more) scanning for an available network and then taking a remedial action. For example, if the OEM subscription 118 was associated with the low capability subscription 114, then the call control module 120 would spend time scanning for an available network, determine that a network was unavailable, end the initial eCall 132, switch the OEM subscription 118 from the low capability subscription 114 to the high capability subscription 116, and reinitiate the eCall 132. In a vehicle accident, such time savings may mean the difference between life and death or the difference between a relatively minor injury (e.g., because the injury from the accident was quickly treated due to the timely placement of the eCall 132) and a severe injury (e.g., caused by the injury from the accident being left untreated for an extended period of time).

Figure 2:
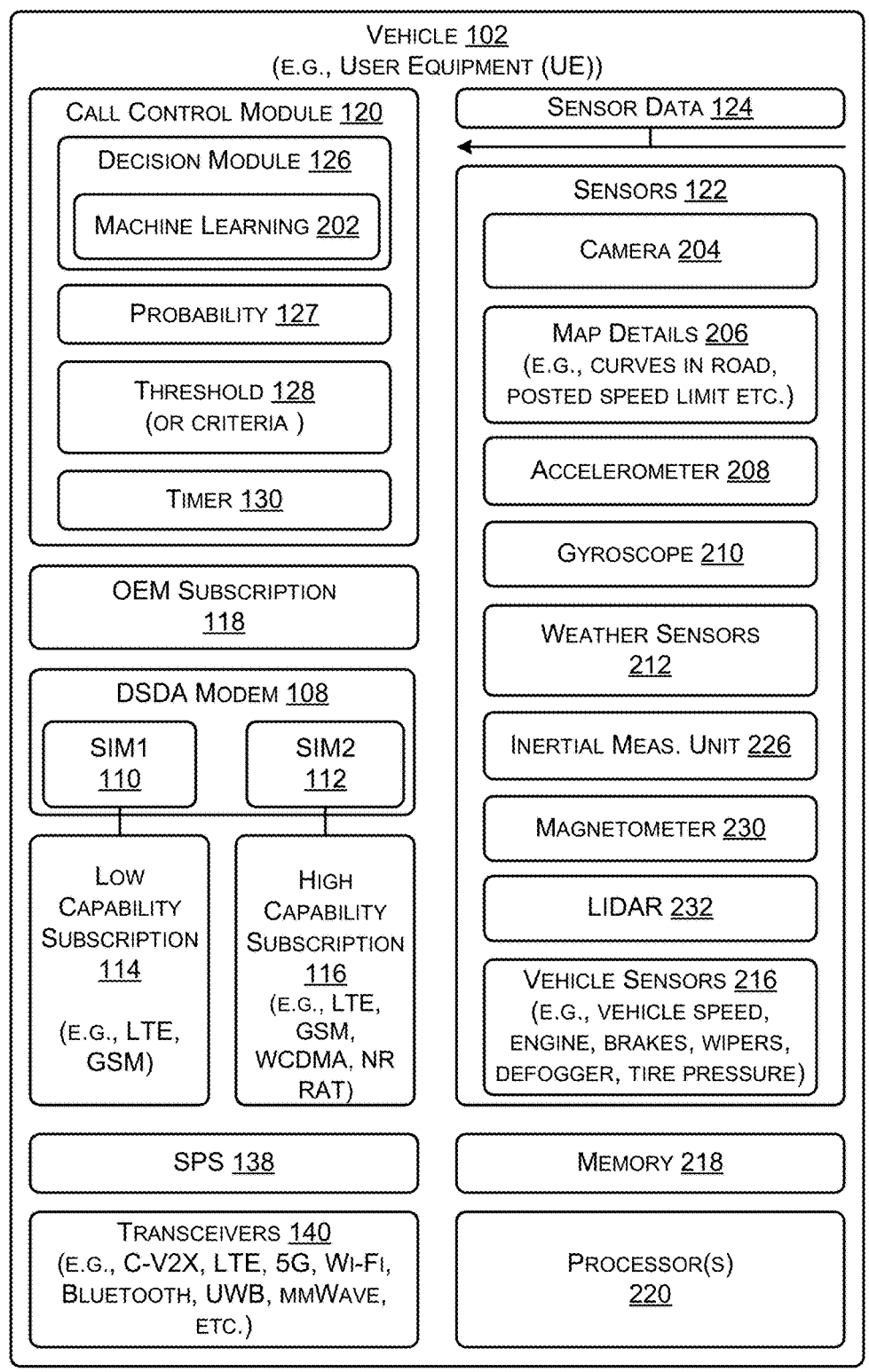
FIG. 2 illustrates an example of a vehicle-based system to switch an OEM subscription to a high capability subscription, according to various aspects of the disclosure.

FIG. 2 illustrates an example of a vehicle-based system 200 to switch an OEM subscription to a high capability subscription, according to various aspects of the disclosure. At least a portion of the components of the vehicle 102 may, in some aspects, be referred to as a user equipment (UE).

In the system 200, the decision module 126 may, in some cases, use machine learning 202 to predict whether the vehicle 102 may be involved in an accident. For example, the machine learning 202 may use supervised learning (e.g., active learning, classification, or regression) or another machine learning technique to predict a probability 127 that the vehicle 102 will be in an accident within a particular time period (e.g., within the next Y seconds, Y>0). To illustrate, the machine learning 202 may be trained on accident data to predict when the vehicle 102 will be involved in an accident. For example, the main reasons for vehicle accidents include speeding (e.g., a speed of the vehicle 102 is above the posted speed limit of a roadway on which the vehicle 102 is traveling), reckless driving (e.g., aggressive maneuvers including, for example, sudden lane changes, rapid acceleration, rapid braking, and the like), inclement weather (e.g., rain, sleet, snow, fog, or other conditions where traction is reduced, visibility is reduced, or the like), tailgating (e.g., the vehicle 102 is too close to another vehicle that is in front of the vehicle 102), and poor road conditions (e.g., potholes, road construction, or the like). The machine learning 202 may be trained to recognize that on a particular location of a particular road, the speed of the vehicle 102 and the weather conditions predict (e.g., with a high degree of probability, such as the probability 127>=70%, 80%, 90%, 95%, or the like) that the vehicle 102 will be in an accident in a particular time period (e.g., within the next Y seconds, 0<Y<=300).

The sensors 122 may include a camera 204, map details 206, an accelerometer 208, a gyroscope 210, weather sensors 212, an inertial measurement unit (IMU) 226, short range communications 228 (e.g., WiFi, Bluetooth, ultrawide band, and the like), a magnetometer 230, light detection and ranging (LIDAR) 232, vehicle sensors 216, or any combination thereof. The camera 204 and the map details 206 provide detailed information associated with a current location of the vehicle 102, including map details 206, such as whether the road that the vehicle is travelling on is straight or curved (and if curved, an angle of the curvature), how many curves are present along a programmed journey, a posted speed limit, whether there is a divider between directional lanes, number of lanes, how many accidents have previously occurred, and the like. For example, the decision module 126 may take into account a current speed of the vehicle 102 (e.g., obtained from a speed sensor of the vehicle sensors 216), a posted speed limit of a road that the vehicle 102 is traveling on, and an angle of a curvature of the road, among other factors, when determining the probability 127.

As another example, the decision module 126 may use data from the accelerometer 208 to determine whether the vehicle 102 is undergoing rapid acceleration and rapid deceleration (e.g., due to the brakes being applied). The decision module 126 may use data from the gyroscope 210 to determine whether the vehicle 102 is undergoing rapid back and forth movement indicative of rapid lane changes. The decision module 126 may use data from a G-force sensor of the vehicle sensors 216 to determine whether the vehicle 102 is being subject to a large amount of G-force, caused by taking a curve in the road to quickly. Thus, the decision module 126 may use the data from the accelerometer 208, the gyroscope 210, and the G-force sensor, among other factors, to determine whether the driver of the vehicle 102 is driving dangerously or erratically when determining the probability 127.

The weather sensors 212 may include, for example, a first temperature sensor that determines the temperature outside of the vehicle 102, a second temperature sensor that determines the temperature inside of the vehicle 102, a rain sensor that detects when rain is falling on the vehicle 102. For example, most vehicles use the rain sensor to detect when rain is falling and automatically turn on wiper blades. When the rain sensor detects that rain is no longer falling, the rain sensor may automatically turn off the wiper blades. The decision module 126 may determine a difference between the temperature inside of the vehicle 102 and the temperature outside of the vehicle 102 to determine whether the vehicle is proceeding in inclement weather. For example, if the temperature difference between the inside and the outside of the vehicle 102 is greater than a threshold amount (e.g., difference of 15 degrees Celsius or greater), the decision module 126 may determine that the vehicle is traveling in inclement weather. The decision module 126 may use the data from the weather sensors 212 to determine whether the vehicle 102 is traveling in inclement weather, such as rain, snow, sleet, fog or the like. The decision module 126 may use a current speed of the vehicle 102 along with the determination as to whether the vehicle 102 is traveling in inclement weather, among other factors, to determine the probability 127. For example, a speed of the vehicle 102 may be below a posted speed limit. However, the speed of the vehicle 102 in inclement weather may increase the probability 127. To illustrate, the vehicle 102 may safely travel through curves of a road at a first speed under ideal conditions (e.g., sunny, no precipitation, and the like) but in inclement weather, the vehicle 102 may be safer traveling at a second speed that is lower than the first speed. Thus, the decision module 126 may take into consideration a current speed of the vehicle 102, a posted speed of a roadway on which the vehicle 102 is located, and weather conditions, among other factors, when determining the probability 127.

The transceivers 140 may, for example, include cellular vehicle-to-everything (C-V2X) components that enable the vehicle 102 to communicate with vehicles and other objects around the vehicle 102, providing 360° non-line-of-sight awareness. The C-V2X components may include vehicle-to-vehicle (V2V), vehicle-to-infrastructure (V2I), vehicle-to-pedestrian (V2P), and vehicle-to-cloud (V2C) communication. The data from the C-V2X components along with the sensor data may be used to determine how many vehicles are near the vehicle 102, a vehicle density near the vehicle 102, pedestrians, and other information related to the surroundings of the vehicle 102. The decision module 126 may take into consideration the sensor data and data from the C-V2X components when determining the probability 127. For example, when the vehicle 102 is traveling faster than a posted speed limit, the vehicle 102 is subject to rapid acceleration/deceleration, the vehicle 102 is subject to rapid lane changes, or any combination thereof, then such characteristics may be considered relatively safe if there are few (or no) other vehicles near the vehicle 102. However, such characteristics may be considered relatively dangerous and potentially contributing to an accident when there are a large number of vehicles near the vehicle 102. Thus, the decision module 126 may determine that speed and erratic driving increases the probability 127 of an accident when the vehicle 102 is surrounded by many other vehicles.

The vehicle sensors 216 may include a vehicle speed sensor (e.g., used by the speedometer to display a speed of the vehicle 102), an engine temperature sensor, a wiper sensor indicating whether the windshield wiper blades are on (e.g., due to inclement weather such as rain, sleet, snow, fog, or the like), brake sensors (e.g., indicating a temperature of the brakes, an amount of wear of the brakes, and the like), a defogger sensor (e.g., indicating whether a defogger has been engaged to defog the front windshield, the back windshield, or both), a tire pressure sensor (e.g., indicating whether the pressure in each of the tires is within a normal range or below), and the like. For example, if the driver has turned on the wiper blades, the defogger, or both, the decision module 126 may determine that the driver has less than ideal visibility and take the reduced visibility into account when determining the probability 127. If the tire pressure sensor indicates that one or more of the tires have a pressure that is below a normal range (e.g., recommended by the manufacturer of the vehicle 102), then the decision module 126 may take that into account when determining the probability 127. For example, if at least one of the tires has a pressure that is below normal and the vehicle 102 is traveling at a particular speed, then the decision module 126 may predict there is a higher probability 127 of the vehicle 102 being involved in an accident as compared to if all of the tires had a pressure that was normal. The brake sensors may indicate a temperature the brakes. For example, frequent braking may cause the brake temperature to increase. Thus, a relatively high brake temperature may indicate that the driver of the vehicle 102 is tailgating or traveling too fast and is frequently using the brakes to slow down to avoid hitting a vehicle in front or to slow down for an upcoming curve in the road.

The vehicle 102 (e.g., a type of user equipment) may include a memory 218, one or more processors 220, and transceivers 140 to receive cellular signals such as, for example, LTE, GSM, CDMA, WCDMA, 5G, and the like and short-range communication signals such as WLAN, Bluetooth, UWB, or other short-range communication signals. The vehicle 102 may include the satellite positioning system (SPS) 138 to receive positioning signals 134 of FIG. 1 (e.g., GPS, GNSS, and the like) from the positioning signal sources 136.

Thus, a call control module in a vehicle may use sensor data from various sensors in the vehicle to determine a probability that the vehicle will be involved in an accident within the near future (e.g., within the next 300 seconds or less). The sensor data may include a current location of the vehicle, map details (e.g., posted speed limit, curves in a road, an amount of curvature of each curve, and the like), accelerometer data, gyroscope data, data from temperature sensors, data from a rain sensor, data from C-V2X sensors, and data from vehicle sensors (e.g., vehicle speed, engine temperature, brake temperature, whether the wipers are on or off, whether one or more defoggers are on or off, tire pressure, and the like), other sensor data, or any combination thereof.

Figure 3:
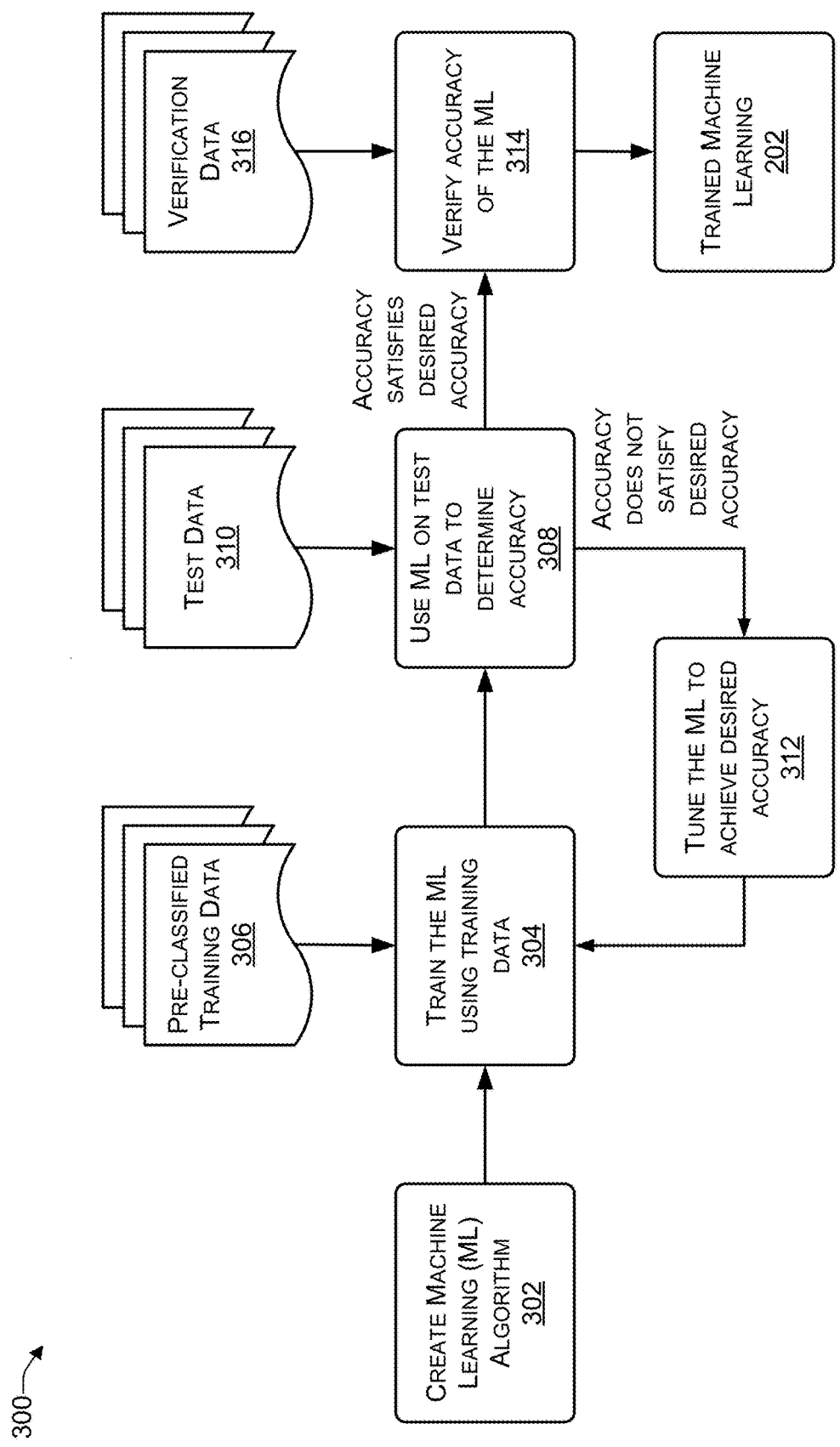
FIG. 3 illustrates an example of system to train a machine learning algorithm, according to various aspects of the disclosure.

FIG. 3 illustrates an example process 300 to train a machine learning algorithm, according to various aspects of the disclosure. The process 300 may be performed by a manufacturer of the vehicle 102 prior to making the vehicle 102 available for acquisition (e.g., purchase or lease).

At 302, the machine learning algorithm (e.g., software code) may be created by one or more software designers. At 304, the machine learning algorithm may be trained using pre-classified training data 306. For example, the training data 306 may have been pre-classified by humans, by machine learning, or a combination of both. After the machine learning has been trained using the pre-classified training data 306, the machine learning may be tested, at 308, using test data 310 to determine an accuracy of the machine learning. For example, in the case of a classifier (e.g., support vector machine), the accuracy of the classification may be determined using the test data 310.

If an accuracy of the machine learning does not satisfy a desired accuracy (e.g., 95%, 98%, 99% accurate), at 308, then the machine learning code may be tuned, at 312, to achieve the desired accuracy. For example, at 312, the software designers may modify the machine learning software code to improve the accuracy of the machine learning algorithm. After the machine learning has been tuned, at 312, the machine learning may be retrained, at 304, using the pre-classified training data 306. In this way, 304, 308, 312 may be repeated until the machine learning is able to classify the test data 310 with the desired accuracy.

After determining, at 308, that an accuracy of the machine learning satisfies the desired accuracy, the process may proceed to 314, where verification data 316 may be used to verify an accuracy of the machine learning. After the accuracy of the machine learning is verified, at 314, the trained machine learning 202, which has been trained to provide a particular level of accuracy, may be used by the decision module 126.

The pre-classified training data 306, the test data 310, and the verification data 316 may include data associated with vehicle accidents. For example, each vehicle accident may include associated data such as, for example, weather conditions, types of roads, vehicle speed, vehicle sensor data, traffic density, and the like.

Figure 4:
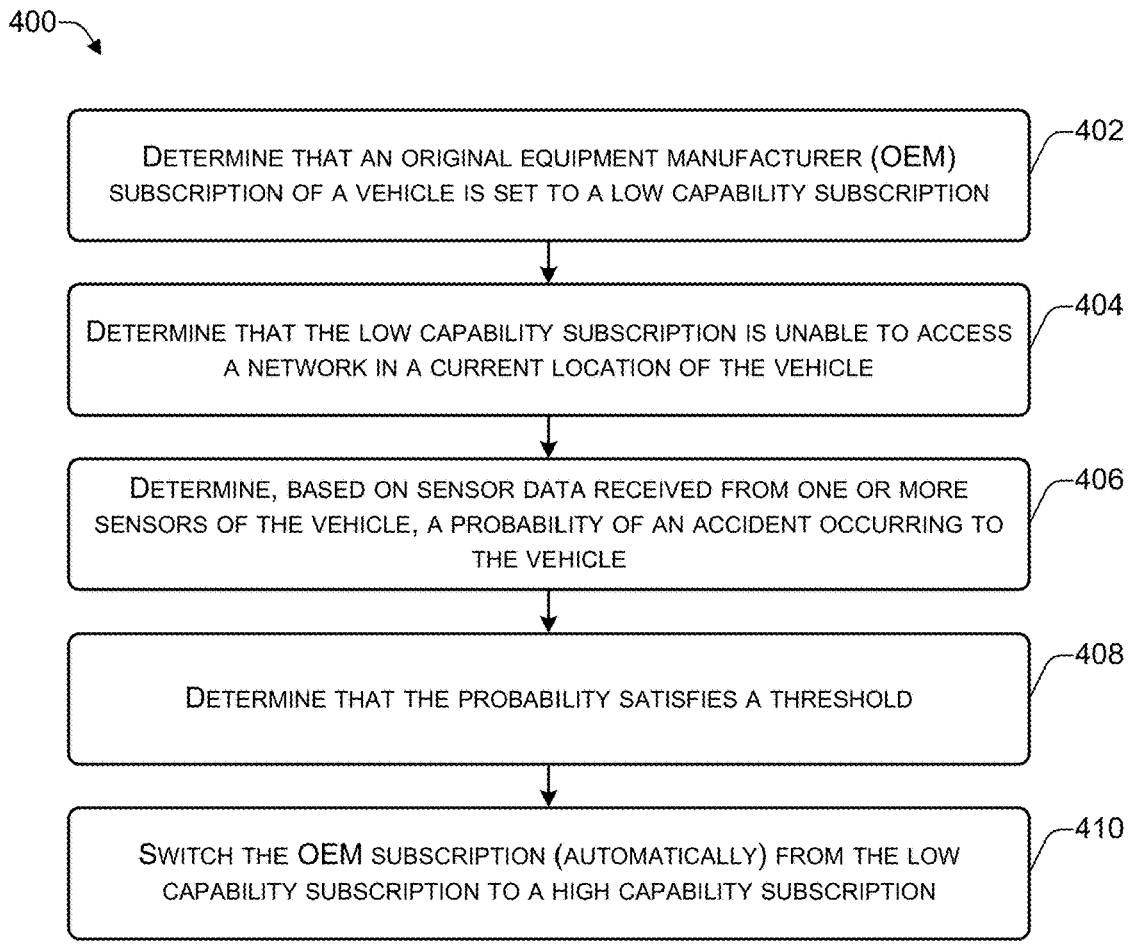
FIG. 4 illustrates an example process that includes determining that a low capability subscription is unable to access a network at a current location of the vehicle based on the low capability subscription, according to aspects of the disclosure.
Figure 5:
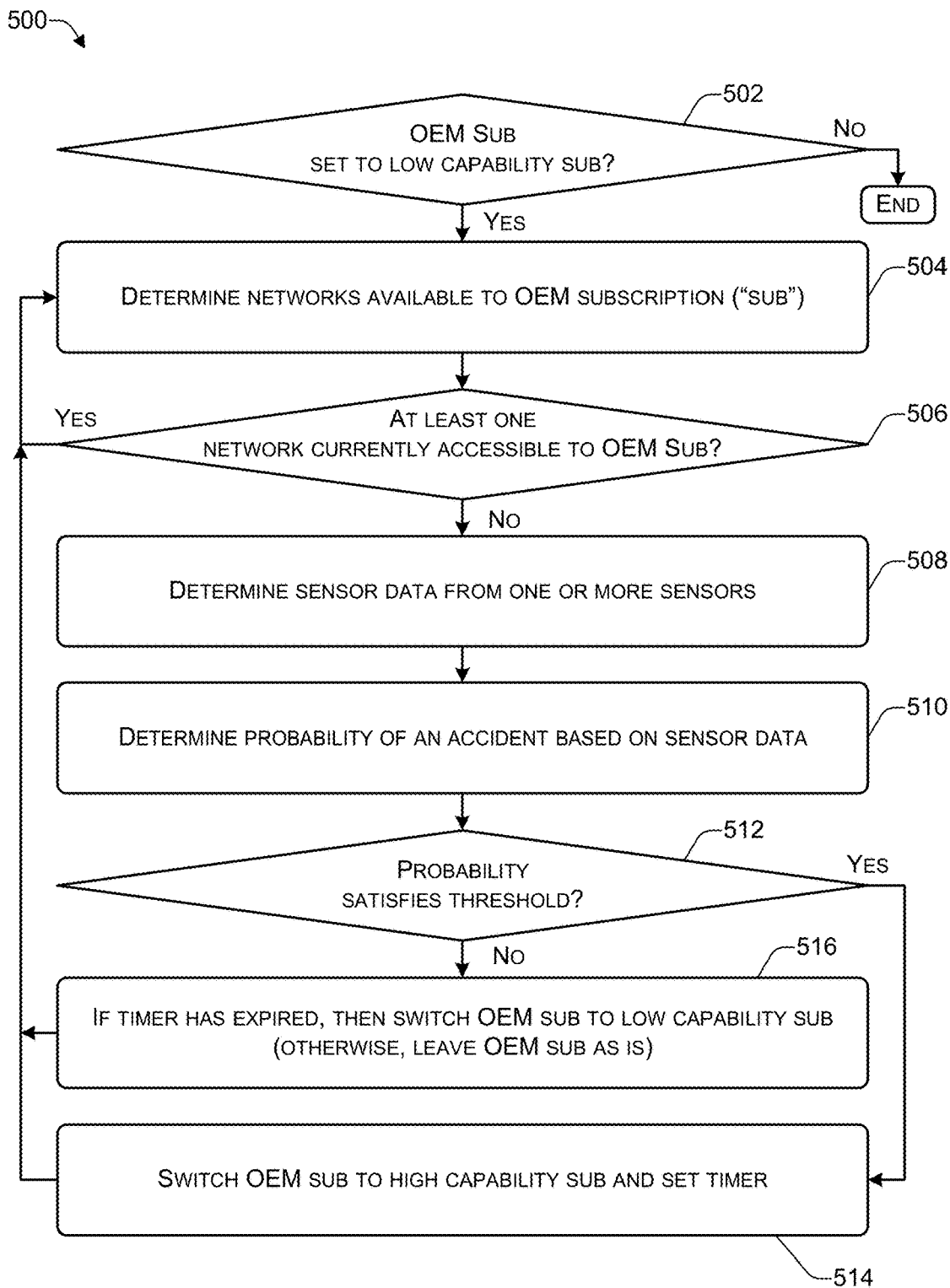
FIG. 5 illustrates an example process that includes determining whether a probability satisfies a threshold, according to aspects of the disclosure.

In the flow diagrams of FIGS. 4 and 5 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIGS. 1, 2, and 3 as described above, although other models, frameworks, systems and environments may be used to implement these processes.

FIG. 4 illustrates an example process 400 that includes determining that a low capability subscription is unable to access a network at a current location of the vehicle based on the low capability subscription, according to aspects of the disclosure. The process 400 may be performed by one or more components of a vehicle (e.g., a user equipment), such as the call control module 120 or the DSDA modem 108 of FIGS. 1 and 2.

At 402, the process 400 determines that an original equipment manufacturer (OEM) subscription of a vehicle is set to a low capability subscription. For example, in FIG. 2, the call control module 120 may determine that the OEM subscription 118 is associated with the low capability subscription 114.

At 404, the process 400 may determine that the low capability subscription is unable to access a network at a current location of the vehicle. For example, in FIG. 2, the call control module 120 may determine that the low capability subscription 114 is unable to access a network at a current location of the vehicle 102.

At 406, the process 400 may determine, based on sensor data received from one or more sensors of the vehicle, that a probability of an accident occurring to the vehicle. At 408, the process 400 may determine that the probability satisfies a threshold. At 410, the process 400 may automatically (e.g., without human interaction) switch the OEM subscription from the low capability subscription to a high capability subscription. For example, in FIG. 2, the call control module 120 receives the sensor data 124 from the sensors 122 and uses the decision module 126 to determine, based on the sensor data 124, the probability 127 that the vehicle 102 will be involved in an accident within a particular time period (e.g., within the next five minutes or less). If the decision module 126 determines that the probability 127 satisfies the threshold 128, e.g., there is a high probability (e.g., probability 127>=75%, 80%, 90%, 95%, or the like) that the vehicle 102 will be involved in an accident in the near future, then the call control module 120 automatically (e.g., without human interaction) switches the OEM subscription 118 from the low capability subscription 114 to the high capability subscription 116.

Thus, one or more components, such as a call control module, in a vehicle may determine that an OEM subscription of a vehicle is set to a low capability subscription, determine that the low capability subscription is unable to access a network at a current location of the vehicle, determine (e.g., based on sensor data) that a probability of an accident occurring to the vehicle satisfies a threshold, and automatically switch the OEM subscription from the low capability subscription to a high capability subscription. As will be appreciated, a technical advantage of the process 400 includes enabling a vehicle to access one or more networks via the high capability subscription, thereby enabling the vehicle to initiate an eCall to emergency services if the vehicle is involved in an accident.

FIG. 5 illustrates an example process 500 that includes determining a probability of an accident, according to aspects of the disclosure. The process 500 may be performed by one or more components of a vehicle, such as the call control module 120 or the DSDA modem 108 of FIGS. 1 and 2.

At 502, the process 500 determines whether an OEM subscription ("sub") is set to a low capability subscription. If the process 500 determines that the OEM subscription is not set to the low capability subscription (e.g., the OEM subscription is set to the high capability subscription), then the process 500 ends. If the process 500 determines that the OEM subscription is set to the low capability subscription, then the process 500 proceeds to 504. For example, in FIG. 2, the call control module 120 determines whether the OEM subscription 118 is associated with the low capability subscription 114 or the high-capability subscription 116. If the call control module 120 determines that the OEM subscription 118 is associated with the high-capability subscription 116, then the call control module 120 takes no further action.

At 504, the process 500 determines networks available to the currently set OEM subscription (low capability subscription). At 506, the process 500 determines whether at least one network is currently accessible. If the process 500 determines, at 506, that at least one network is currently accessible to the OEM subscription, then the process 500 proceeds back to 504. If the process 500 determines, at 506, that no network is currently accessible to the OEM subscription, then the process 500 proceeds to 508. For example, in FIG. 2, if the call control module 120 determines that the OEM subscription 118 is associated with the low capability subscription 114, then the call control module 120 determines which networks are currently accessible (e.g., at a current location of the vehicle 102). If the call control module 120 determines that at least one network is currently available via the OEM subscription 118, then the call control module 120 continues to monitor which networks are accessible as the location of the vehicle 102 changes. If the call control module 120 determines that no network is currently accessible via the OEM subscription 118, then the process proceeds to 508.

At 508, the process 500 obtains sensor data from one or more sensors. At 510, the process 500 determines the probability of an accident occurring (e.g., within a particular time period, such as within the next five minutes or less) based on the sensor data. At 512, the process 500 determines whether the probability satisfies a threshold. If the process 500 determines, at 512, that the probability does not satisfy the threshold, then the process proceeds to 516. At 516, if the process 500 determines that a timer has expired, then the process 500 switches the OEM subscription to the low capability subscription. If the process 500 determines that the timer has not expired, then the process 500 does not take any action with regard to the OEM subscription. After 516, the process 500 proceeds back to 504. For example, in FIG. 2, the call control module 120 receives the sensor data 124 from the sensors 122 and uses the decision module 126 to determine, based on the sensor data 124, the probability 127 that the vehicle 102 will be involved in an accident within a particular time period (e.g., within the next five minutes or less). The decision module 126 determines whether the probability 127 satisfies threshold 128. If the decision module 126 determines that the probability 127 fails to satisfy the threshold 128, then the decision module 126 checks to see if the timer 130 has expired. If the timer 130 has expired, then the decision module 126 switches the OEM subscription 118 back to the low capability subscription 114. If the timer 130 has not expired, then the decision module keeps the OEM subscription 118 associated with the high capability subscription 116. The call control module 120 then determines the networks currently accessible to the OEM subscription 118 at a current location of the vehicle 102.

If the process 500 determines, at 512, that the probability satisfies the threshold, then the process 500 proceeds to 514. At 514, the process 500 automatically (e.g., without human interaction) switches the OEM subscription (e.g., from the low capability subscription) to a high capability subscription, set a timer (e.g., a hysteresis timer), and proceeds back to 504. For example, in FIG. 2, if the decision module 126 determines that the probability 127 satisfies the threshold 128, e.g., there is a high probability (e.g., probability 127>=75%, 80%, 90%, 95%, or the like) that the vehicle 102 will be involved in an accident in the near future, then the call control module 120 automatically switches the OEM subscription 118 from the low capability subscription 114 to the high capability subscription 116. The call control module 120 then determines the networks currently accessible to the OEM subscription 118 at a current location of the vehicle 102.

Thus, a call control module in a vehicle may determine whether the OEM subscription is set to the low capability subscription or the high capability subscription. If the OEM subscription is set to the low capability subscription, then the call control module monitors which networks are available to the OEM subscription at the vehicle's current location. If no networks are available to the OEM subscription, then the call control module monitors sensor data and determines a probability that the vehicle will be involved in an accident within the near future. If the sensor data indicates with a high degree of probability that the vehicle will be involved in an accident within the near future, then the call control module automatically switches the OEM subscription from the low capability subscription to the high capability subscription. In this way, if an accident occurs, the vehicle can automatically place an eCall to a PSAP using the OEM subscription that is switched to the high capability subscription because the high capability subscription provides access to more networks as compared to the low capability subscription. A timer is set after the call control module switches the OEM subscription to the high capability subscription to prevent the call control module from rapidly switching the OEM subscription back and forth between the low capability subscription and the high capability subscription.

Figure 6:
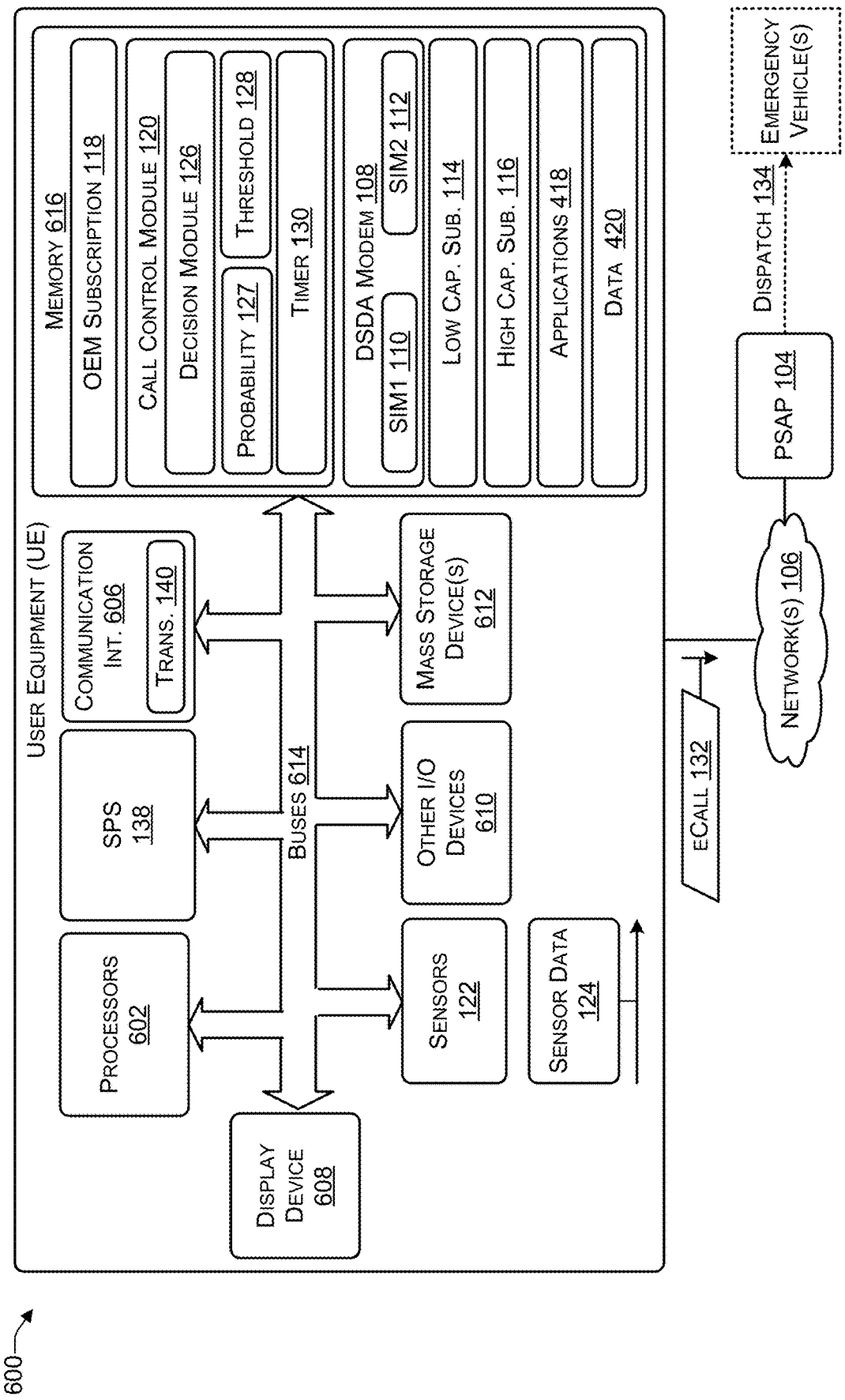
FIG. 6 illustrates an example of a user equipment (UE) that can be used to implement the systems, techniques, and processes described herein.

FIG. 6 illustrates an example of a user equipment (UE) 600 that can be used to implement the systems, techniques, and processes described herein. For example, the vehicle 102 of FIGS. 1 and 2 may include at least a portion of the user equipment 600.

The UE 600 may include one or more processors 602 (e.g., central processing unit (CPU), graphics processing unit (GPU), or the like), a memory 604, communication interfaces 606 (including the transceivers 140), a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial advanced technology attachment (SATA) and the like), data buses (e.g., universal serial bus (USB) and the like), video signal buses (e.g., ThunderBolt®, digital video interface (DVI), high-definition media interface (HDMI), and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., compact disk (CD), digital video disk (DVD)), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The UE 600 may include one or more communication interfaces 606 for exchanging data. The communication interfaces 606 can facilitate communications within a wide variety of networks and protocol types, including wired networks such as Ethernet, Data Over Cable Service Interface Specification (DOCSIS), digital subscriber line (DSL), Fiber, USB etc. and wireless networks such as wireless local area network (WLAN), cellular (e.g., global system for mobile (GSM), code division multiple access (CDMA), 5G, long term evolution (LTE), and the like), short range communications (e.g., 802.11, Bluetooth, Wireless USB, ultra-wide band (UWB), ZigBee, millimeter (mm) wave, and other types of nearfield communication protocols), satellite (satellite positioning system (SPS), global positioning satellite (GPS), global navigation satellite system (GNSS), etc., the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 616 and mass storage devices 612, may be used to store software and data. For example, the computer storage media may be used to store the OEM subscription 118, the call control module 120, the DSDA modem 108, the low cap. sub. 114, the high cap. sub. 116, additional applications 418 and additional data 420.

Figure 7A:
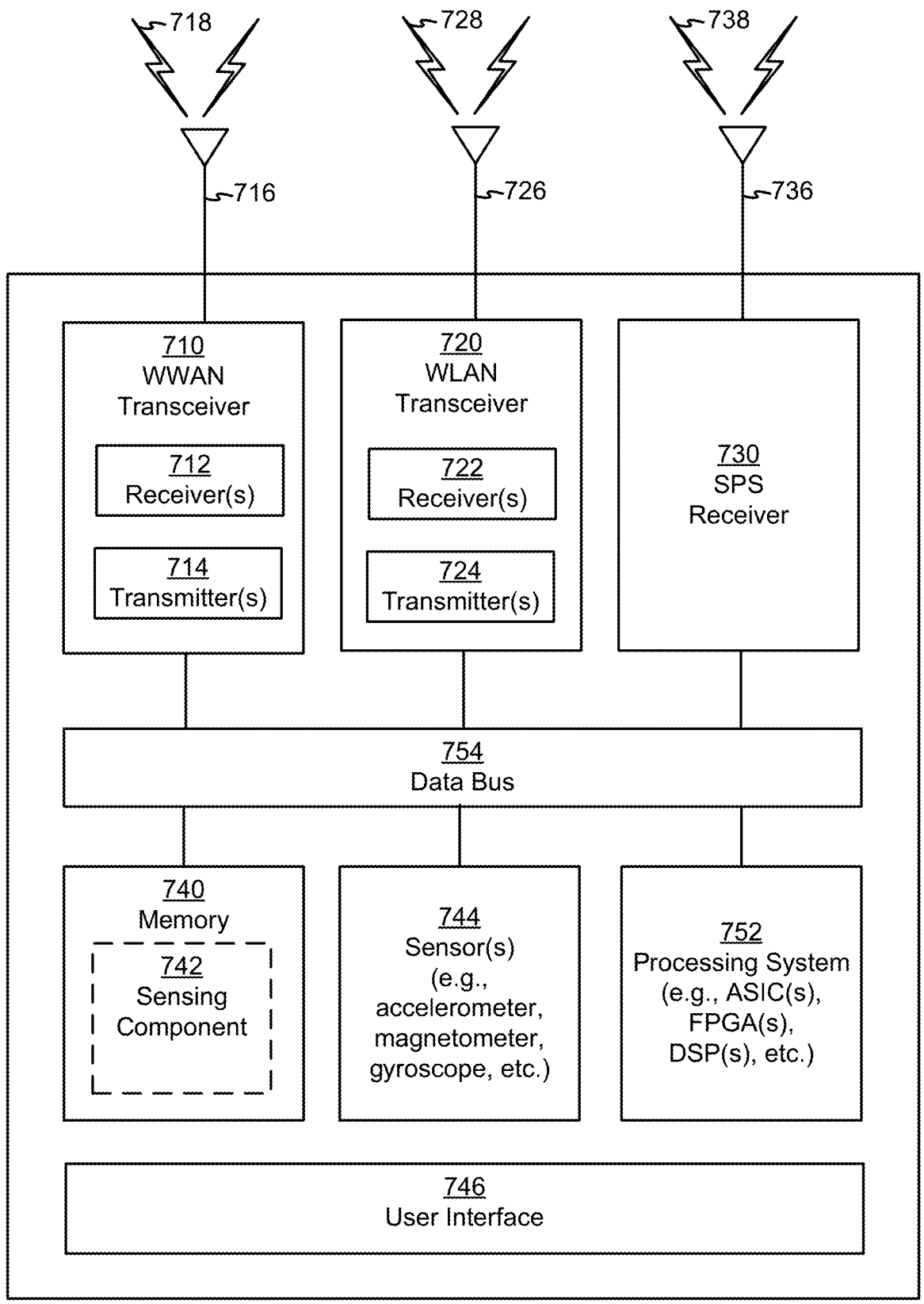
FIGS. 7A and 7B are simplified block diagrams of several sample aspects of components that may be employed in wireless communication nodes and configured to support communication as described herein.
Figure 7B:
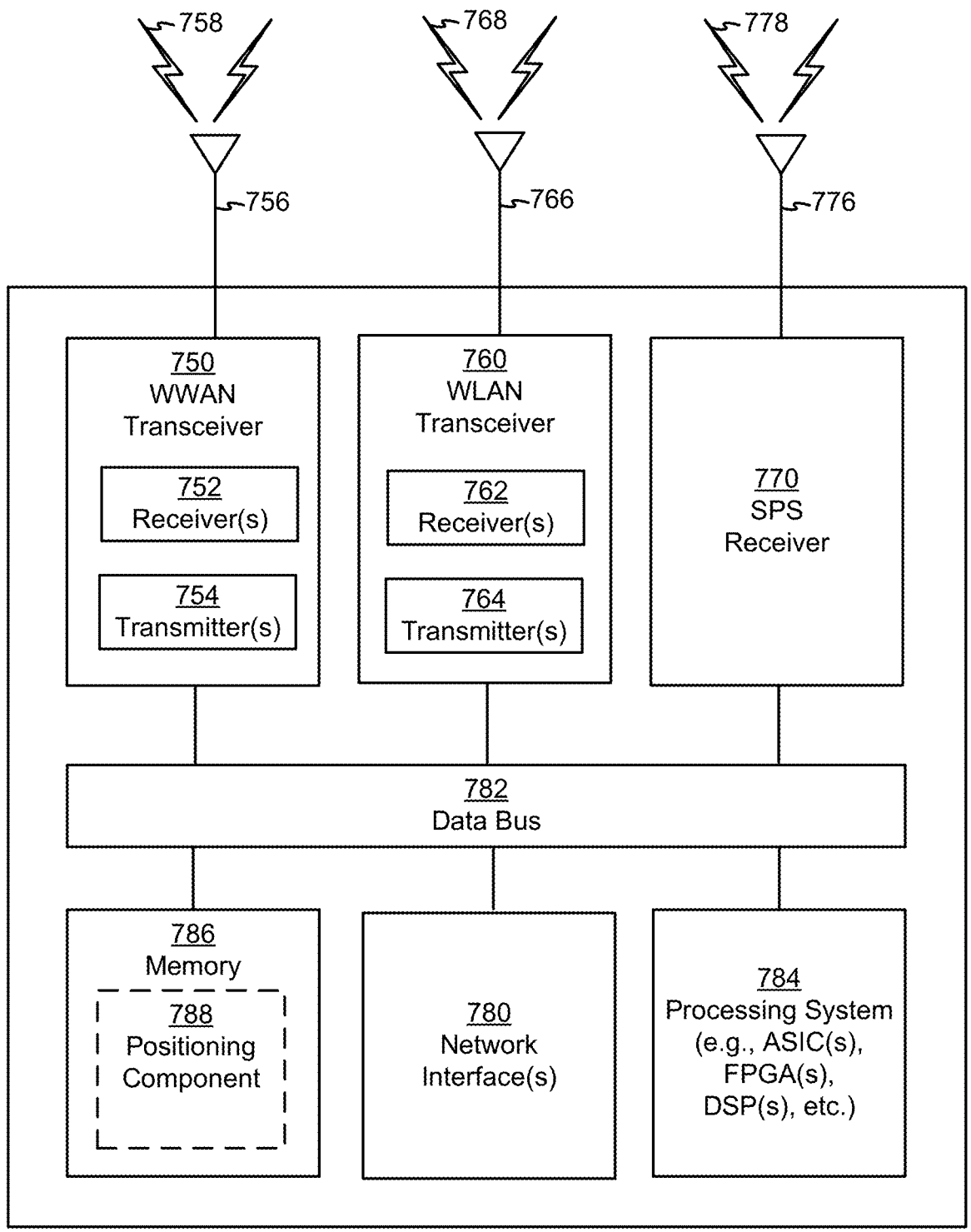

Referring to FIGS. 7A and 7B, several example components (represented by corresponding blocks) that may be incorporated into a UE (e.g., the vehicle 102 of FIG. 1), a base station (which may correspond to any of the base stations described herein), and a network entity (which may correspond to or embody any of the network functions described herein) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE, base station, or network entity may include wireless wide area network (WWAN) transceiver 710 and 750 (e.g., transceivers 140 of FIGS. 1, 2, and 6), respectively, configured to communicate via one or more wireless communication networks (not shown), such as an NR network, an LTE network, a GSM network, and/or the like. The WWAN transceivers 710 and 750 may be connected to one or more antennas 716 and 756, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum).

The WWAN transceivers 710 and 750 may be variously configured for transmitting and encoding signals 718 and 758 (e.g., messages, indications, information, and so on), respectively, and, conversely, for receiving and decoding signals 718 and 758 (e.g., messages, indications, information, pilots, and so on), respectively, in accordance with the designated RAT. Specifically, the transceivers 710 and 750 include one or more transmitters 714 and 754, respectively, for transmitting and encoding signals 718 and 758, respectively, and one or more receivers 712 and 752, respectively, for receiving and decoding signals 718 and 758, respectively.

The UE and the base station also include, at least in some cases, wireless local area network (WLAN) transceivers 720 and 760, respectively. The WLAN transceivers 720 and 760 may be connected to one or more antennas 726 and 766, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 720 and 760 may be variously configured for transmitting and encoding signals 728 and 768 (e.g., messages, indications, information, and so on), respectively, and, conversely, for receiving and decoding signals 728 and 768 (e.g., messages, indications, information, pilots, and so on), respectively, in accordance with the designated RAT. Specifically, the transceivers 720 and 760 include one or more transmitters 724 and 764, respectively, for transmitting and encoding signals 728 and 768, respectively, and one or more receivers 722 and 762, respectively, for receiving and decoding signals 728 and 768, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 716, 726, 756, 766), such as an antenna array, that permits the respective apparatus to perform transmit "beamforming," as described herein. Similarly, a receiver may include or be coupled to a plurality of antennas (e.g., antennas 716, 726, 756, 766), such as an antenna array, that permits the respective apparatus to perform receive beamforming, as described herein. In an aspect, the transmitter and receiver may share the same plurality of antennas (e.g., antennas 716, 726, 756, 766), such that the respective apparatus can only receive or transmit at a given time, not both at the same time. A wireless communication device (e.g., one or both of the transceivers 710 and 720 and/or 750 and 760) of the UE and/or the base station may also comprise a network listen module (NLM) or the like for performing various measurements.

The UE and the base station may include, at least in some cases, satellite positioning systems (SPS) receivers 730 and 770 (e.g., SPS 138 of FIGS. 1, 2, and 6). The SPS receivers 730 and 770 may be connected to one or more antennas 736 and 776, respectively, for receiving SPS signals 738 and 778, respectively, such as Global Positioning System (GPS) signals, GLObal NAvigation Satellite System (GLONASS) signals, Galileo signals, Beidou signals, Indian Regional Navigation Satellite System (NAVIC), Quasi-Zenith Satellite System (QZSS), etc. The SPS receivers 730 and 770 may comprise any suitable hardware and/or software for receiving and processing SPS signals 738 and 778, respectively. The SPS receivers 730 and 770 request information and operations as appropriate from the other systems, and performs calculations necessary to determine positions of the UE and the base station using measurements obtained by any suitable SPS algorithm.

The base station and the network entity may each include at least one network interface 780 for communicating with other network entities. For example, the network interfaces 780 (e.g., one or more network access ports) may be configured to communicate with one or more network entities via a wire-based or wireless backhaul connection. In some aspects, the network interfaces 780 may be implemented as transceivers configured to support wire-based or wireless signal communication. This communication may involve, for example, sending and receiving messages, parameters, and/or other types of information.

The UE, the base station, and the network entity may include other components that may be used in conjunction with the operations as disclosed herein. The UE may include processor circuitry implementing a processing system 732 for providing functionality relating to, for example, RF sensing, and for providing other processing functionality. The base station may include a processing system 784 for providing functionality relating to, for example, RF sensing as disclosed herein, and for providing other processing functionality. The network entity may include a processing system for providing functionality relating to, for example, Wi-Fi positioning or RF sensing as disclosed herein, and for providing other processing functionality. In an aspect, the processing systems 732, 784 may include, for example, one or more general purpose processors, multi-core processors, ASICs, digital signal processors (DSPs), field programmable gate arrays (FPGA), or other programmable logic devices or processing circuitry.

The UE, the base station, and the network entity may include memory circuitry implementing memory components 740, 786 (e.g., each including a memory device), respectively, for maintaining information (e.g., information indicative of reserved resources, thresholds, parameters, and so on). In some cases, the UE, the base station, and the network entity may include positioning components 742, 788, respectively. The positioning components 742, 788 may be hardware circuits that are part of or coupled to the processing systems 732, 784 respectively, that, when executed, cause the UE, the base station, and the network entity to perform the functionality described herein. In other aspects, the positioning components 742, 788 may be external to the processing systems 732, 784 (e.g., part of a modem processing system, integrated with another processing system, etc.). Alternatively, the positioning components 742, 788 may be memory modules (as shown in FIGS. 7A, 7B) stored in the memory components 740, 786 respectively, that, when executed by the processing systems 732, 784 (or a modem processing system, another processing system, etc.), cause the UE, the base station, and the network entity to perform the functionality described herein.

The UE may include one or more sensors 744 coupled to the processing system 732 to provide movement and/or orientation information that is independent of motion data derived from signals received by the WWAN transceiver 710, the WLAN transceiver 720, and/or the SPS receiver 730. By way of example, the sensor(s) 744 may include an accelerometer (e.g., a micro-electrical mechanical system (MEMS) device), a gyroscope, a geomagnetic sensor (e.g., a compass), an altimeter (e.g., a barometric pressure altimeter), and/or any other type of movement detection sensor. Moreover, the sensor(s) 744 may include a plurality of different types of devices and combine their outputs in order to provide motion information. For example, the sensor(s) 744 may use a combination of a multi-axis accelerometer and orientation sensors to provide the ability to compute positions in 2D and/or 3D coordinate systems.

In addition, the UE may include a user interface 746 for providing indications (e.g., audible and/or visual indications) to a user and/or for receiving user input (e.g., upon user actuation of a sensing device such a keypad, a touch screen, a microphone, and so on). Although not shown, the base station and the network entity may also include user interfaces.

Referring to the processing system 784 in more detail, in the downlink, IP packets from the network entity may be provided to the processing system 784. The processing system 784 may implement functionality for an RRC layer, a packet data convergence protocol (PDCP) layer, a radio link control (RLC) layer, and a medium access control (MAC) layer. The processing system 784 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 754 and the receiver 752 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 754 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE. Each spatial stream may then be provided to one or more different antennas 756. The transmitter 754 may modulate an RF carrier with a respective spatial stream for transmission.

At the UE, the receiver 712 receives a signal through its respective antenna(s) 716. The receiver 712 recovers information modulated onto an RF carrier and provides the information to the processing system 732. The transmitter 714 and the receiver 712 implement Layer-1 functionality associated with various signal processing functions. The receiver 712 may perform spatial processing on the information to recover any spatial streams destined for the UE. If multiple spatial streams are destined for the UE, they may be combined by the receiver 712 into a single OFDM symbol stream. The receiver 712 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station. These soft decisions may be based on channel estimates computed by a channel estimator. The soft decisions are then decoded and de-interleaved to recover the data and control signals that were originally transmitted by the base station on the physical channel. The data and control signals are then provided to the processing system 732, which implements Layer-3 and Layer-2 functionality.

In the uplink, the processing system 732 provides demultiplexing between transport and logical channels, packet reassembly, deciphering, header decompression, and control signal processing to recover IP packets from the core network. The processing system 732 is also responsible for error detection.

Similar to the functionality described in connection with the downlink transmission by the base station, the processing system 732 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station may be used by the transmitter 714 to select the appropriate coding and modulation schemes, and to facilitate spatial processing. The spatial streams generated by the transmitter 714 may be provided to different antenna(s) 716. The transmitter 714 may modulate an RF carrier with a respective spatial stream for transmission.

The uplink transmission is processed at the base station in a manner similar to that described in connection with the receiver function at the UE. The receiver 752 receives a signal through its respective antenna(s) 756. The receiver 752 recovers information modulated onto an RF carrier and provides the information to the processing system 784.

In the uplink, the processing system 784 provides demultiplexing between transport and logical channels, packet reassembly, deciphering, header decompression, control signal processing to recover IP packets from the UE. IP packets from the processing system 784 may be provided to the core network. The processing system 784 is also responsible for error detection.

For convenience, the UE, the base station, and/or the network entity are shown in FIGS. 7A, 7B as including various components that may be configured according to the various examples described herein. It will be appreciated, however, that the illustrated blocks may have different functionality in different designs.

The various components of the UE, the base station, and the network entity may communicate with each other over data buses 734, 782 respectively. The components of FIGS. 7A, 7B may be implemented in various ways. In some implementations, the components of FIGS. 7A, 7B may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 710 to 746 may be implemented by processor and memory component(s) of the UE (e.g., by execution of appropriate code and/or by appropriate configuration of processor components). Similarly, some or all of the functionality represented by blocks 750 to 788 may be implemented by processor and memory component(s) of the base station (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 732, 784 the transceivers 710, 720, 750, and 760, the memory components 740, 786 the positioning components 742, 788 etc.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, an optical disk, or any other form of storage medium known in the art. An example storage medium is coupled to the processor such that the processor can read information from, and write information to, the storage medium. In the alternative, the storage medium may be integral to the processor (e.g., cache memory).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause. Implementation examples are described in the following numbered clauses:

Clause 1. A method comprising: determining, by a processor of a vehicle, that an original equipment manufacturer (OEM) subscription of the vehicle is set to a low capability subscription; determining, by the processor, that the low capability subscription is unable to access a network at a current location of the vehicle based on the low capability subscription; determining, by the processor and based on sensor data received from one or more sensors of the vehicle, a probability of an accident occurring to the vehicle; determining, by the processor, that the probability satisfies a threshold; and switching, by the processor, the OEM subscription from the low capability subscription to a high capability subscription.

Clause 2. The method of clause 1, further comprising: determining that the accident has occurred to the vehicle; and initiating an emergency call (eCall) to a Public Safety Answering Point (PSAP).

Clause 3. The method of any of clauses 1 to 2, wherein determining, based on the sensor data received from the one or more sensors of the vehicle, the probability of the accident occurring to the vehicle comprises: receiving the sensor data from the one or more sensors; and using a machine learning algorithm to determine, based on the sensor data, the probability of the accident occurring to the vehicle.

Clause 4. The method of any of clauses 1 to 3, further comprising: setting a timer; determining, based on second sensor data received from the one or more sensors of the vehicle, a second probability; determining, that the second probability fails to satisfy the threshold; and in response to determining that the timer has expired, switching the OEM subscription from the high capability subscription to the low capability subscription.

Clause 5. The method of any of clauses 1 to 4, wherein: the high capability subscription is capable of accessing a particular network that the low capability subscription is incapable of accessing.

Clause 6. The method of clause 5, wherein: the particular network comprises one of a Long Term Evolution (LTE) network, a Global System for Mobile (GSM) network, a Code Division Multiple Access (CDMA) network, a Wideband Code Division Multiple Access (WCDMA) network, or a 5G New Radio (NR) Radio Access Technology (RAT) network.

Clause 7. The method of any of clauses 1 to 6, wherein determining, based on the sensor data received from the one or more sensors of the vehicle, the probability that the accident will occur to the vehicle comprises at least one of: determining that a vehicle speed exceeds a posted limit of a roadway on which the vehicle is travelling; determining that the vehicle is travelling in inclement weather comprising at least one of rain, sleet, snow, or fog; determining that at least one of gyroscope data or accelerometer data indicates aggressive driving; or determining that cellular vehicle-to-everything (C-V2X) data indicates a relatively high traffic density around the vehicle.

Clause 8. The method of any of clauses 1 to 7, further comprising: determining an estimated time of arrival at a destination programmed into a navigation system of the vehicle; and setting a timer based in part on a difference between the estimated time of arrival and a current time.

Clause 9. The method of any of clauses 1 to 8, further comprising: determining a destination programmed into a navigation system of the vehicle; determining a length of time that inclement weather is predicted to be encountered enroute to the destination; and setting a timer based at least in part on the length of time.

Clause 10. The method of any of clauses 1 to 9, further comprising: determining a destination programmed into a navigation system of the vehicle; determining an estimated amount of time to be spent navigating one or more curves enroute to the destination; and setting a timer based at least in part on the estimated amount of time.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method comprising:
   determining, by a processor of a vehicle, that an original equipment manufacturer (OEM) subscription of the vehicle is set to a low capability subscription;
   determining, by the processor, that the low capability subscription is unable to access a network at a current location of the vehicle based on the low capability subscription;
   determining, by the processor and based on sensor data received from one or more sensors of the vehicle, a probability of an accident occurring to the vehicle;
   determining, by the processor, that the probability satisfies a threshold; and
   switching, by the processor, the OEM subscription from the low capability subscription to a high capability subscription in response to determining that the probability satisfies the threshold.

2. The method of claim 1, further comprising:
   determining that the accident has occurred to the vehicle; and
   initiating an emergency call (eCall) to a Public Safety Answering Point (PSAP).

3. The method of claim 1, wherein determining, based on the sensor data received from the one or more sensors of the vehicle, the probability of the accident occurring to the vehicle comprises:
   receiving the sensor data from the one or more sensors; and
   using a machine learning algorithm to determine, based on the sensor data, the probability of the accident occurring to the vehicle.

4. The method of claim 1, further comprising:
   setting a timer;
   determining, based on second sensor data received from the one or more sensors of the vehicle, a second probability;
   determining, that the second probability fails to satisfy the threshold; and
   in response to determining that the timer has expired, switching the OEM subscription from the high capability subscription to the low capability subscription.

5. The method of claim 1, wherein:
   the high capability subscription is capable of accessing a particular network that the low capability subscription is incapable of accessing.

6. The method of claim 5, wherein:
   the particular network comprises one of a Long Term Evolution (LTE) network, a Global System for Mobile (GSM) network, a Code Division Multiple Access (CDMA) network, a Wideband Code Division Multiple Access (WCDMA) network, or a 5G New Radio (NR) Radio Access Technology (RAT) network.

7. The method of claim 1, wherein determining, based on the sensor data received from the one or more sensors of the vehicle, the probability that the accident will occur to the vehicle comprises at least one of:
  determining that a vehicle speed exceeds a posted limit of a roadway on which the vehicle is travelling;
  determining that the vehicle is travelling in inclement weather comprising at least one of rain, sleet, snow, or fog;
  determining that at least one of gyroscope data or accelerometer data indicates aggressive driving; or
  determining that cellular vehicle-to-everything (C-V2X) data indicates a relatively high traffic density around the vehicle.

8. The method of claim 1, further comprising:
  determining an estimated time of arrival at a destination programmed into a navigation system of the vehicle; and
  setting a timer based in part on a difference between the estimated time of arrival and a current time.

9. The method of claim 1, further comprising:
  determining a destination programmed into a navigation system of the vehicle;
  determining a length of time that inclement weather is predicted to be encountered enroute to the destination; and
  setting a timer based at least in part on the length of time.

10. The method of claim 1, further comprising:
  determining a destination programmed into a navigation system of the vehicle;
  determining an estimated amount of time to be spent navigating one or more curves enroute to the destination; and
  setting a timer based at least in part on the estimated amount of time.

11. A vehicle comprising:
  one or more sensors;
  a memory;
  a transceiver; and
  a processor that is communicatively coupled to the memory and the transceiver, the processor configured to:
    determine that an original equipment manufacturer (OEM) subscription of the vehicle is set to a low capability subscription;
    determine that the low capability subscription is unable to access a network at a current location of the vehicle based on the low capability subscription;
    determine, based on sensor data received from the one or more sensors, a probability of an accident occurring to the vehicle;
    determine that the probability satisfies a threshold; and
    switch the OEM subscription from the low capability subscription to a high capability subscription in response to determining that the probability satisfies the threshold.

12. The vehicle of claim 11, wherein the processor is further configured to:
  determine that the accident has occurred to the vehicle; and
  initiate an emergency call (eCall) to a Public Safety Answering Point (PSAP).

13. The vehicle of claim 11, wherein the processor is further configured to:
  receive the sensor data from the one or more sensors; and
  use a machine learning algorithm to determine, based on the sensor data, the probability of the accident occurring to the vehicle.

14. The vehicle of claim 11, wherein the processor is further configured to:
  set a timer;
  determine, based on second sensor data received from the one or more sensors of the vehicle, a second probability;
  determine, that the second probability fails to satisfy the threshold; and
  after determining that the timer has expired, switching the OEM subscription from the high capability subscription to the low capability subscription.

15. The vehicle of claim 11, wherein:
  the high capability subscription is capable of accessing a particular network that the low capability subscription cannot access.

16. The vehicle of claim 15, wherein:
  the particular network comprises one of a Long Term Evolution (LTE) network, a Global System for Mobile (GSM) network, a Wideband Code Division Multiple Access (WCDMA) network, or a 5G New Radio (NR) Radio Access Technology (RAT) network.

17. The vehicle of claim 11, wherein the processor is further configured to:
  determine that a vehicle speed exceeds a posted limit of a roadway on which the vehicle is travelling;
  determine that the vehicle is travelling in inclement weather comprising at least one of rain, sleet, snow, or fog;
  determine that at least one of gyroscope data or accelerometer data indicates aggressive driving;
  determine that cellular vehicle-to-everything (C-V2X) data indicates a relatively high traffic density around the vehicle; or
  any combination thereof.

18. The vehicle of claim 11, wherein the processor is further configured to:
  determine an estimated time of arrival at a destination programmed into a navigation system of the vehicle; and
  set a timer based in part on a difference between the estimated time of arrival and a current time.

19. The vehicle of claim 11, wherein the processor is further configured to:
  determine a destination programmed into a navigation system of the vehicle;
  determine a length of time that inclement weather is predicted to be encountered enroute to the destination; and
  set a timer based at least in part on the length of time.

20. The vehicle of claim 11, wherein the processor is further configured to:
  determine a destination programmed into a navigation system of the vehicle;
  determine an estimated amount of time to be spent navigating one or more curves enroute to the destination; and
  set a timer based at least in part on the estimated amount of time.

21. A non-transitory computer-readable storage medium to store instructions executable by one or more processors to:
  determine that an original equipment manufacturer (OEM) subscription of a vehicle is set to a low capability subscription;
  determine that the low capability subscription is unable to access a network at a current location of the vehicle based on the low capability subscription;

determine, based on sensor data received from one or more sensors, a probability of an accident occurring to the vehicle;
determine that the probability satisfies a threshold; and
switch the OEM subscription from the low capability subscription to a high capability subscription in response to determining that the probability satisfies the threshold.

22. The non-transitory computer-readable storage medium of claim 21, the instructions further executable to:
determine that the accident has occurred to the vehicle; and
initiate an emergency call (eCall) to a Public Safety Answering Point (PSAP).

23. The non-transitory computer-readable storage medium of claim 21, wherein the instructions to determine, based on the sensor data received from the one or more sensors of the vehicle, the probability of the accident occurring to the vehicle comprise instructions to:
receive the sensor data from the one or more sensors;
use a machine learning algorithm to determine, based on the sensor data, the probability of the accident occurring to the vehicle;
set a timer;
determine, based on second sensor data received from the one or more sensors of the vehicle, a second probability;
determine, that the second probability fails to satisfy the threshold; and
after determining that the timer has expired, change the OEM subscription from the high capability subscription to the low capability subscription.

24. The non-transitory computer-readable storage medium of claim 21, wherein:
the high capability subscription is capable of accessing a particular network that the low capability subscription cannot access; and
the particular network comprises at least one of a Long Term Evolution (LTE) network, a Global System for Mobile (GSM) network, a Wideband Code Division Multiple Access (WCDMA) network, or a 5G New Radio (NR) Radio Access Technology (RAT) network.

25. The non-transitory computer-readable storage medium of claim 21, wherein the instructions to determine, based on the sensor data received from the one or more sensors of the vehicle, the probability that the accident will occur to the vehicle comprises at least one of instructions to:
determine that a vehicle speed exceeds a posted limit of a roadway on which the vehicle is travelling;
determine that the vehicle is travelling in inclement weather comprising at least one of rain, sleet, snow, or fog;
determine that at least one of gyroscope data or accelerometer data indicates aggressive driving; or
determine that cellular vehicle-to-everything (C-V2X) data indicates a relatively high traffic density around the vehicle.

26. An apparatus comprising:
means for determining that an original equipment manufacturer (OEM) subscription of a vehicle is set to a low capability subscription;
means for determining that the low capability subscription is unable to access a network at a current location of the vehicle based on the low capability subscription;
means for determining, based on sensor data received from one or more sensors, a probability of an accident occurring to the vehicle;
means for determining that the probability satisfies a threshold; and
means for changing the OEM subscription from the low capability subscription to a high capability subscription in response to determining that the probability satisfies the threshold.

27. The apparatus of claim 26, further comprising:
means for determining that the accident has occurred to the vehicle; and
means for initiating an emergency call (eCall) to a Public Safety Answering Point (PSAP).

28. The apparatus of claim 26, wherein the means for determining, based on the sensor data received from the one or more sensors of the vehicle, the probability of the accident occurring to the vehicle comprise:
means for receiving the sensor data from the one or more sensors;
means for determining, using a machine learning algorithm and based on the sensor data, the probability of the accident occurring to the vehicle;
means for setting a timer;
means for determining, based on second sensor data received from the one or more sensors of the vehicle, a second probability;
means for determining, that the second probability fails to satisfy the threshold; and
after determining that the timer has expired, means for changing the OEM subscription from the high capability subscription to the low capability subscription.

29. The apparatus of claim 26, wherein:
the high capability subscription is capable of accessing a particular network that the low capability subscription cannot access; and
the particular network comprises at least one of a Long Term Evolution (LTE) network, a Global System for Mobile (GSM) network, a Wideband Code Division Multiple Access (WCDMA) network, or a 5G New Radio (NR) Radio Access Technology (RAT) network.

30. The apparatus of claim 26, wherein means for determining, based on the sensor data received from the one or more sensors of the vehicle, the probability that the accident will occur to the vehicle comprises at least one of:
means for determining that a vehicle speed exceeds a posted limit of a roadway on which the vehicle is travelling;
means for determining that the vehicle is travelling in inclement weather comprising at least one of rain, sleet, snow, or fog;
means for determining that at least one of gyroscope data or accelerometer data indicates aggressive driving; or
means for determining that cellular vehicle-to-everything (C-V2X) data indicates a relatively high traffic density around the vehicle.

* * * * *